(No Model.)

H. F. GANON.
VEHICLE WHEEL GUARD.

No. 599,294. Patented Feb. 15, 1898.

Witnesses
R. D. Hawkins.
Jula Green

Inventor
Henry F. Ganon
By V. H. Lockwood
His Attorney.

UNITED STATES PATENT OFFICE.

HENRY F. GANON, OF INDIANAPOLIS, INDIANA, ASSIGNOR OF ONE-HALF TO WILLIAM TRON.

VEHICLE-WHEEL GUARD.

SPECIFICATION forming part of Letters Patent No. 599,294, dated February 15, 1898.

Application filed October 27, 1897. Serial No. 656,606. (No model.)

*To all whom it may concern:*

Be it known that I, HENRY F. GANON, of Indianapolis, county of Marion, and State of Indiana, have invented a certain new and useful Vehicle-Wheel Guard; and I do hereby declare that the following is a full, clear, and exact description thereof, reference being had to the accompanying drawings, in which like numerals refer to like parts.

This invention relates to improvements upon the wheel-guards heretofore patented by me.

The object of these improvements is to simplify and cheapen the construction, so as to render it practically useful, make the device easier to put together and take apart, and to improve the operation of it.

The features of invention will appear from the following claims and description and the accompanying drawings.

Figure 1:
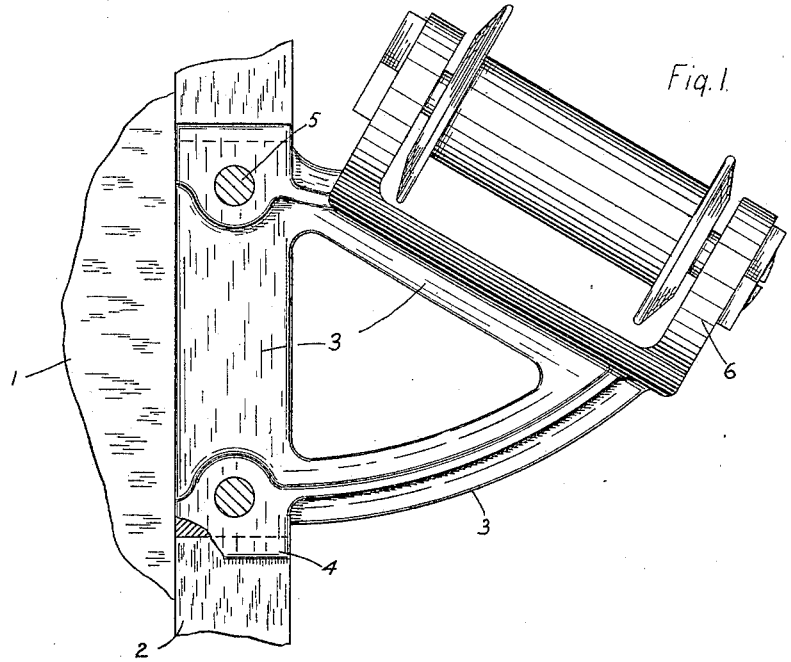
Figure 2:
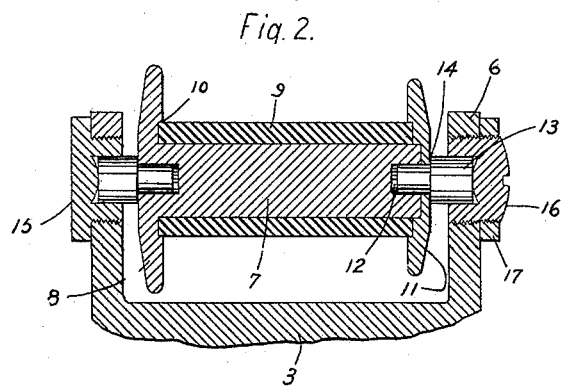

In the drawings, Figure 1 is a bottom view of my wheel-guard secured in place to the bed of the vehicle, the bed being broken away. Fig. 2 is a central longitudinal section through the roller and its mountings.

In detail, 1 is the bed of the vehicle, along the side of the bottom of which a metallic strap 2 is usually placed. I cut out a section of this strap to receive the frame 3 of the wheel-guard. This frame is thicker than the straps 2, so that in each end I make a notch, as indicated in Fig. 1, having a square shoulder that abuts snugly against the cut end of the strap 2 and a flange 4, that overlaps the end of such strap. The frame of the wheel-guard is secured in place by bolts 5. (Shown in Fig. 1 in section.) This arrangement makes the mounting or attachment of the wheel-guard frame neater and especially stronger in resisting the pressure or twist given to the frame by the cramping of a wheel against the roller.

A pair of arms 6 extend parallel with each other from the frame or the bracket 3 at an angle to the side of the vehicle-bed. In these arms internally-threaded apertures are made, as shown. Between the arms the roller is placed, its length being greater than the distance between the arms. The roller comprises a metallic body portion 7, having on one end an integral radial flange or collar 8. Around the metallic body of the roller I place a rubber sleeve 9, whose end fits in an annular groove 10 in the flange or collar. At the other end of the roller I provide a removable flange or collar 11, that is recessed, so as to slip over the end of the body portion 7 of the roller, as seen in Fig. 2. Centrally through this flange or collar 11 I make an aperture registering with the recess or hole 12, centrally located in the end of the metallic body 7 of the roller. The recess 12 is made at each end thereof and the purpose is to receive the journal-pins 13. These pins are adapted to be driven into the recesses 12, yet not so tightly but that they can be readily removed. They are provided with shoulders 14, that abut against the flanges or collars 8 and 11.

The bearings 15 and 16 for the journal-pins are externally threaded to be screwed into the internally-threaded apertures in the arm 6 of the frame. The bearing 15 has a nut-head to lock it in place, as this is seldom removed. The bearing 16 has a slot for a screw-driver, as this bearing must be screwed outward and inward in the removal or adjustment of the roller. When in place, it is held by the nut 17. Each bearing 15 and 16 has a central recess to receive the journal-pins. The journal-pins are preferably square or flat ended, while the bearings at the inner ends of the recesses therein are oval or beveled, as shown, so that the flat ends of the journal-pins bear centrally against the central portion of the beveled surface in the bearings. By this construction I am enabled to make the journal-pins and bearings out of the best metal for bearings, such as tool-steel, regardless of the quality of the metal forming the other parts of the device. Furthermore, the roller is easily inserted or removed. In the process of removal the bearing 16 is unscrewed and the journal-pin 13 taken out, whereupon the roller is easily removed. It is replaced by reversing the operation just described. In putting it in place it is observed that the flange or collar 11 is held in place and forced into position by the shoulder on the journal-pin 13. With this construction I can readily remove the flange or collar 11 without the necessity of unscrewing it. It is to be observed that the flange or collar 8, placed at the inner end of the roller, is large, as it is the one that receives the pressure from a cramping-wheel. The other flange or collar 11 never receives any pressure from the wheel. It is merely used to hold the rubber sleeve in place and protect it and the bearings and arm 6, and therefore need not be so large. It is obvious that the vehicle-wheel in cramping moves in toward the vehicle-bed and the inner end of the roller.

By this invention I can use a solid integral frame with its bearing-arms flat and ungrooved or otherwise weakened; also, the bearing is well within the apertures in the arms 6, so it will be strong.

What I claim as my invention, and desire to secure by Letters Patent, is—

1. A vehicle-wheel guard including a roller comprising a metallic body portion with a flange or collar near each end thereof and with each end centrally recessed, and removable journal-pins secured in the apertures in the body portion of the roller.

2. A vehicle-wheel guard including a frame with oppositely-placed internally-threaded apertures, a roller with a flange or collar near each end and with a journal-pin removably secured in one end thereof, and externally-threaded bearings that are screwed into the apertures in the frame to receive the ends of the roller.

3. A vehicle-wheel guard including a frame with oppositely-placed internally-threaded apertures, a roller with a flange or collar near each end and with a flat-ended journal-pin removably secured in the ends of the roller, and externally-threaded bearings that are screwed into the apertures in the frame and are provided with recesses whose inner surface is oval or bevel to receive the journal-pins of the roller.

4. A vehicle-wheel guard including a frame with two oppositely-placed internally-threaded apertures, a roller comprising a metallic body portion centrally recessed at its ends and having at its ends flanges or collars, one of said flanges or collars being removable, a rubber sleeve around the metallic body of the roller, and journal-pins removably secured in the recesses in the metallic body of said roller and provided with shoulders that abut against the said flanges or collars, and externally-threaded bearings that are screwed into the apertures in the frame and provided with recesses to receive the journal-pins of the roller.

In witness whereof I have hereunto set my hand this 14th day of October, 1897.

HENRY F. GANON.

Witnesses:
V. H. LOCKWOOD,
ZULA GREEN.